W. P. BARCLAY.
CENTRIFUGAL CREAM SEPARATOR.
APPLICATION FILED JULY 29, 1909.

1,020,248.

Patented Mar. 12, 1912.
2 SHEETS—SHEET 1.

WITNESSES:
Peter Douglas
Lee Sternsdorf

INVENTOR
William Paris Barclay

W. P. BARCLAY.
CENTRIFUGAL CREAM SEPARATOR.
APPLICATION FILED JULY 29, 1909.

1,020,248.

Patented Mar. 12, 1912.
2 SHEETS—SHEET 2.

WITNESSES
Peter Douglas
Lee Ttensdorf

INVENTOR
William Paris Barclay

UNITED STATES PATENT OFFICE.

WILLIAM PARIS BARCLAY, OF CHICAGO, ILLINOIS.

CENTRIFUGAL CREAM-SEPARATOR.

1,020,248.  Specification of Letters Patent.  Patented Mar. 12, 1912.

Application filed July 29, 1909. Serial No. 510,314.

*To all whom it may concern:*

Be it known that I, WILLIAM PARIS BARCLAY, a citizen of the United States, residing at Chicago, in the county of Cook and State of Illinois, have invented certain new and useful Improvements in Centrifugal Cream-Separators.

This invention relates to cream separators, in which the centrifugal force given to the milk contained within a revolving vessel is used as a means to force apart the heavier and lighter constituents of the milk so that the cream separates from the milk more expeditiously than under a natural process, and the said invention consists in a novel arrangement of a centrifugal bowl and other parts that will be described hereafter. I attain these objects by the mechanism illustrated in the accompanying drawings, in which—

Figure 1:
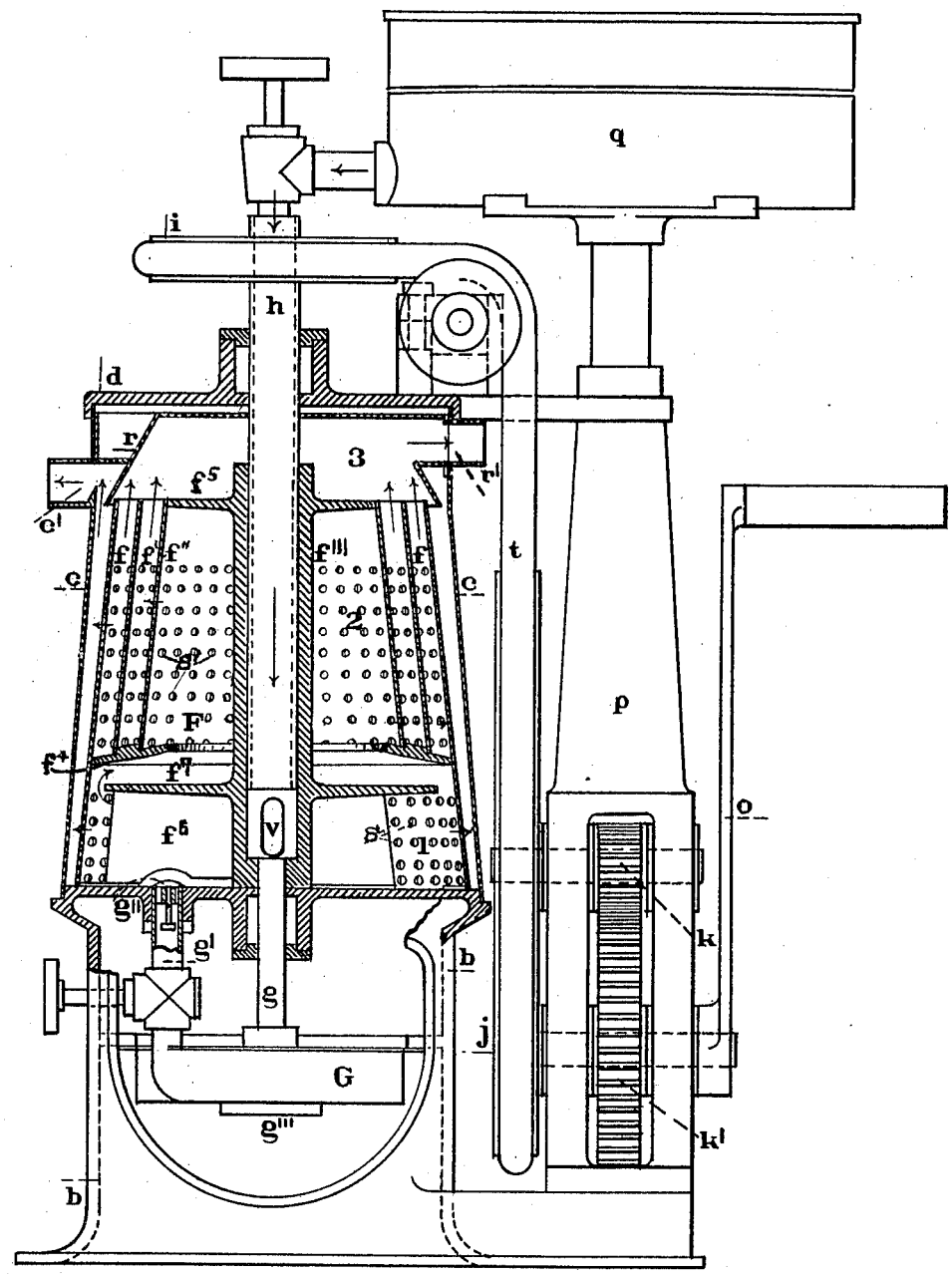
Figure 3:
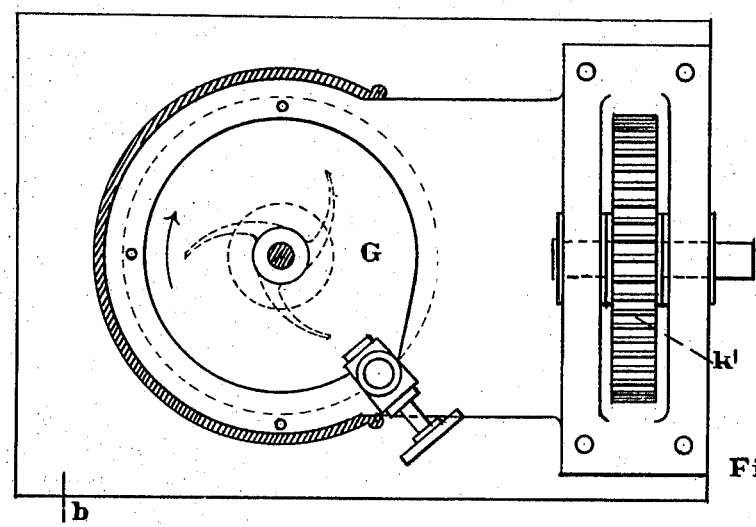
Figure 2:
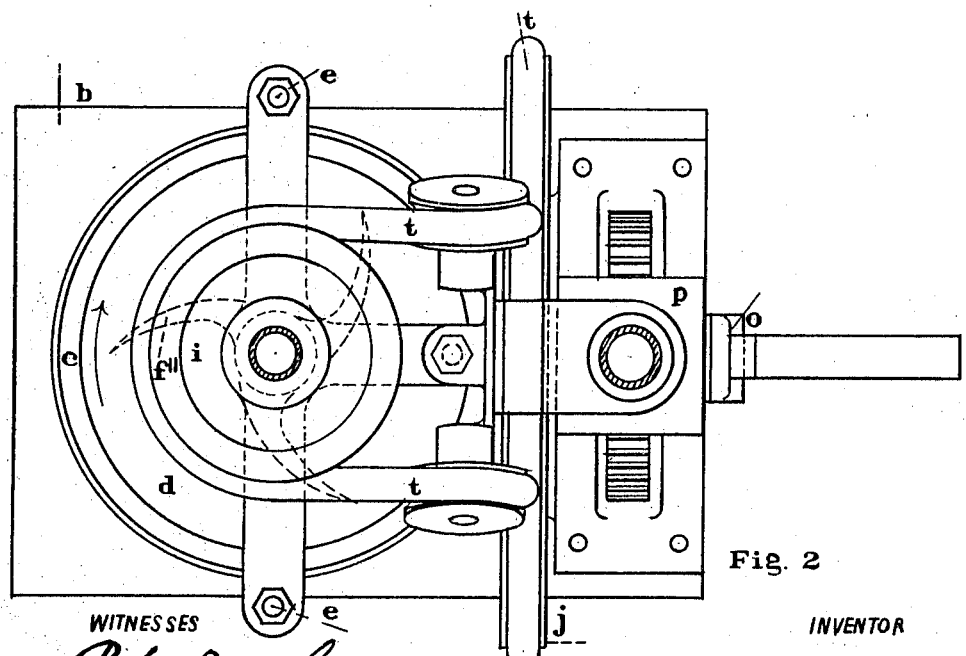

Figure 1, shows an elevation of the apparatus, the centrifugal bowl and its casing being shown in section. Fig. 2, shows an upper plan view, and Fig. 3 a lower plan view of the apparatus.

Similar letters refer to similar parts throughout the several views.

The base $b$, supports the superstructure of the apparatus, and the said base is preferably made an iron casting to give rigidity and strength to the parts attached thereto. The casing $c$, rests upon the base $b$, and is held rigid to the said base by the cover $d$ being clamped to the base $b$, by the bolts $e$. The centrifugal bowl F, is virtually formed with a lower chamber 1 and an upper chamber 2, and the centrifugal bowl consists of an exterior perforated shell $f$, with an intermediate and an inner perforated shell, each shell centrally positioned so as to revolve concentrically with the tubular spindle $f'''$, of the bowl F. The intermediate perforated shell $f'$, and the inner perforated shell $f''$, at their lower ends join with the intermediate annular base $f^4$ that also carries and supports the outer perforated shell $f$ at a distance from its lower end. The cap-plate $f^5$, projecting from the tubular spindle $f'''$, forms a head to the inner perforated shell $f''$, so that the chambers 2 and 3 have a partition or a dividing head separating the said chambers. The tubular spindle $f'''$, is further provided with propulsion vanes $f^6$, that are covered by a cap-plate $f^7$, which prevents the milk ascending to the upper chamber 2 from the lower chamber 1, of the centrifugal bowl, except by way of the outer circumference of the cap-plate $f^7$.

The milk supply pipe $h$, rigidly connects with the tubular spindle $f'''$ of the centrifugal bowl; and the pulley $i$, is firmly attached to the said pipe $h$, for rope transmission from the drive pulley $j$, which is operated through a pinion gear $k$, meshing with a similar but larger gear $k'$, that is given a revolving movement when the lever $o$, is caused to revolve. The pedestal $p$, forms a frame for the gear wheels $k$, $k'$, and also a stand for the fountain pail $q$. Situated at the upper end thereof and within the casing $c$, and also immediately above the perforated shells $f$, $f'$, and $f''$, and forming communication therewith, is a conical discharge hood $r$, that forms a chamber 3 above the centrifugal bowl F, so that the cream in its ascent from and between the perforated shells $f$, $f'$, and $f''$, will collect in the said chamber 3, previous to its discharge from the spout $r'$, into a convenient receptacle.

The discharge spout $c'$, formed on the casing $c$, is for conveying the skim milk located between the casing $c$, and the exterior perforated shell $f$, to a convenient receptacle, and the relative positions of the cream spout $r'$, to the skim milk discharge spout $c'$, as shown in Fig. 1, can be adjusted to have said spouts conveniently close to each other. The small apertures of the perforated shells $f$, $f'$, and $f''$, through which the milk is forced during the separation of the cream from the skim milk, are represented by the parallel and dotted lines $s$, $s'$, the said apertures not necessarily being confined to any definite shape.

The small centrifugal air blower G, is rigidly secured to the base $b$, and the said blower is provided with a spindle $g$, which is secured to the lower end of the tubular spindle $f'''$, of the centrifugal bowl, and the spindle $g$ of the centrifugal blower is provided with vanes $g^8$, that propel or force air from the said blower G into chamber 1, of the centrifugal bowl F, by way of the discharge pipe $g'$, and the discharge valve $g''$, of the centrifugal blower. The spindle $g$, and the vanes $g^8$, of the centrifugal blower revolve with the spindle of the centrifugal bowl F.

Having described the several parts of the apparatus, the operation of the same is as follows:—The fountain pail $q$, having a supply of milk, and the bowl F of the cream separator being set in motion by the action of force revolving the lever o, to turn the gear wheels k, k', meshing with each other, so that the drive pulley j, through the transmission rope t will transmit a revolving motion to the small rope pulley i, attached to the central milk supply pipe h, connected to the tubular spindle f''', of the centrifugal bowl F, causes the said bowl F to revolve at a high velocity; and the milk from the fountain pail q, passing down the milk supply pipe h, and through apertures v, at the lower end of the tubular spindle f''' into chamber 1, of the centrifugal bowl F, is given a high centrifugal velocity by the revolving motion of the vanes $f^6$, forming part of the centrifugal bowl; and the milk pressing outward by the action of centrifugal force, and against the lower portion of the exterior perforated shell f, of the centrifugal bowl, is separated of a portion of its heavier milk constituent by passing through the apertures s, of the perforated shell f, into the receptacle between the casing c, and the exterior perforated shell f; and a certain amount of the heavier milk constituent with the cream escapes around the circumferential edge of the cap-plate $f^7$ into chamber 2, of the centrifugal bowl F, and a separation of the remaining heavier milk constituent from the cream takes place, through centrifugal action forcing the heavier milk constituent through apertures s', in the perforated shells f', and f'', into the skim milk receptacle between the exterior perforated shell f and the casing c. The skim milk leaving the said receptacle by way of the spout c', into a convenient vessel, and the cream ascending into chamber 3, formed by the hood r, escapes by way of the spout r', into a convenient vessel. The function of the blower G, is to force air into chamber 1 of the centrifugal bowl, so as to mix with the milk and assist the separation of the cream from the heavier milk constituent by the forced ascent of the air through the milk in the centrifugal bowl, so that during the time that a high centrifugal force is throwing the heavier part of the milk outward and forcing it through the apertures s, s', of the perforated shells f, f' and f'', the buoyancy of the air from the centrifugal blower G, materially assists the separation of the cream from the heavier milk constituent in its ascent through the milk and through the centrifugal bowl, prior to its escape with the cream through the cream spout r'.

What I claim as new and desire to secure by Letters-Patent is:—

1. In a cream separator the combination within a casing of a centrifugal bowl divided into a lower and an upper chamber, and provided with a tubular spindle formed with propulsion vanes, a cap plate covering the propulsion vanes, an intermediate annular base supporting an intermediate and an inner perforated shell, an upper dividing head formed with the tubular spindle, and a hood above the upper dividing head forming a cream chamber, substantially as shown and described.

2. The combination with a cream separator of a small centrifugal air blower with an extended spindle connecting directly to a centrifugal bowl spindle, and the discharge pipe of the air blower connected to force air into the centrifugal bowl to assist in the separation of the cream from the milk in its ascent through the centrifugal bowl.

3. In a centrifugal cream separator the combination of a small centrifugal air blower with a spindle extended from the cream separator bowl, an air discharge pipe with an air valve suitably connected between the air blower and the interior of the centrifugal bowl, so that air will be admitted to the centrifugal bowl to assist in the separation of the cream from the milk, substantially as described.

In testimony whereof I have signed my name to this specification in the presence of two subscribing witnesses.

WILLIAM PARIS BARCLAY.

Witnesses:
PETER DOUGLAS,
JAMES SCULLY.

Copies of this patent may be obtained for five cents each, by addressing the "Commissioner of Patents, Washington, D. C."